United States Patent
Chandramouli et al.

(10) Patent No.: US 12,200,813 B2
(45) Date of Patent: Jan. 14, 2025

(54) SELECTIVE INDICATIONS TOWARDS USER EQUIPMENT

(71) Applicant: Nokia Technologies Oy, Espoo (FI)

(72) Inventors: Devaki Chandramouli, Plano, TX (US); Alessio Casati, West Molesey (GB); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 375 days.

(21) Appl. No.: 17/758,322

(22) PCT Filed: Nov. 13, 2020

(86) PCT No.: PCT/IB2020/060706
§ 371 (c)(1),
(2) Date: Jul. 1, 2022

(87) PCT Pub. No.: WO2021/140372
PCT Pub. Date: Jul. 15, 2021

(65) Prior Publication Data
US 2023/0028544 A1    Jan. 26, 2023

Related U.S. Application Data

(60) Provisional application No. 62/957,485, filed on Jan. 6, 2020.

(51) Int. Cl.
*H04W 8/06* (2009.01)
*H04W 60/04* (2009.01)
*H04W 60/06* (2009.01)
*H04W 48/18* (2009.01)

(52) U.S. Cl.
CPC ............. *H04W 8/06* (2013.01); *H04W 60/04* (2013.01); *H04W 60/06* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 2018/0309575 A1 | 10/2018 | Nair | |
| 2019/0116486 A1* | 4/2019 | Kim | H04W 8/10 |
| 2019/0174449 A1* | 6/2019 | Shan | H04W 60/04 |
| 2019/0230556 A1* | 7/2019 | Lee | H04W 28/16 |
| 2021/0051468 A1* | 2/2021 | Baskaran | H04W 48/16 |

OTHER PUBLICATIONS

"3rd Generation Partnership Project; Technical Specification Group Core Network and Terminals; Non-Access-Stratum (NAS) protocol for 5G System (5GS); Stage 3; (Release 16)", 3GPP TS 24.501, V16.3.0, Dec. 2019, pp. 1-645.

(Continued)

*Primary Examiner* — Xavier S Wong
(74) *Attorney, Agent, or Firm* — Robert P. Michal, Esq.; Carter, DeLuca & Farrell LLP

(57) ABSTRACT

Systems, methods, apparatuses, and computer program products for selective indications towards a UE (110), for example, at de-registration (110) from an AMF with request to re-register (130) with another AMF, are provided.

1 Claim, 5 Drawing Sheets

(56) References Cited

OTHER PUBLICATIONS

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

"On AMF reallocation and Isolation", SA WG2 Meeting #136-AH, S2-190xxxx, Agenda: x.x, Nokia, Jan. 13-17, 2020, pp. 1-2.

"Correction of the Registration with AMF re-allocation procedure", 3GPP TSG-SA WG2 Meeting #139E, S2-2003763, Nokia, Jun. 1-12, 2020, 6 pages.

International Search Report and Written Opinion received for corresponding Patent Cooperation Treaty Application No. PCT/IB2020/060706, dated Feb. 10, 2021, 17 pages.

"AMF redirection in case of slice isolation", SA WG2 Meeting #135, S2-1909570, Nokia, Oct. 14-18, 2019, 21 pages.

"AMF Reallocation", 3GPP TSG-SA WG2 Meeting #136, S2-1911105, Ericsson, Oct. 14-18, 2019, 3 pages.

"On AMF reallocation and Isolation", SA WG2 Meeting #136-AH, S2-2000815, Agenda: 6.1, Nokia, Jan. 13-17, 2020, 2 pages.

"Correction of the Registration with AMF re-allocation procedure", 3GPP TSG-SA WG2 Meeting #136-AH, S2-2000819, Nokia, Jan. 13-17, 2020, 5 pages.

\* cited by examiner

SELECTIVE INDICATIONS TOWARDS USER EQUIPMENT

RELATED APPLICATION

This application was originally filed as PCT Application No. PCT/IB2020/060706, filed on Nov. 13, 2020, which claims priority from U.S. Provisional Application No. 62/957,485, filed on Jan. 6, 2020, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for indicating to user equipment (UE) when to request to re-register in systems, such as a 5G system (5GS).

BACKGROUND

Examples of mobile or wireless telecommunication systems may include the Universal Mobile Telecommunications System (UMTS) Terrestrial Radio Access Network (UTRAN), Long Tenn Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1A:
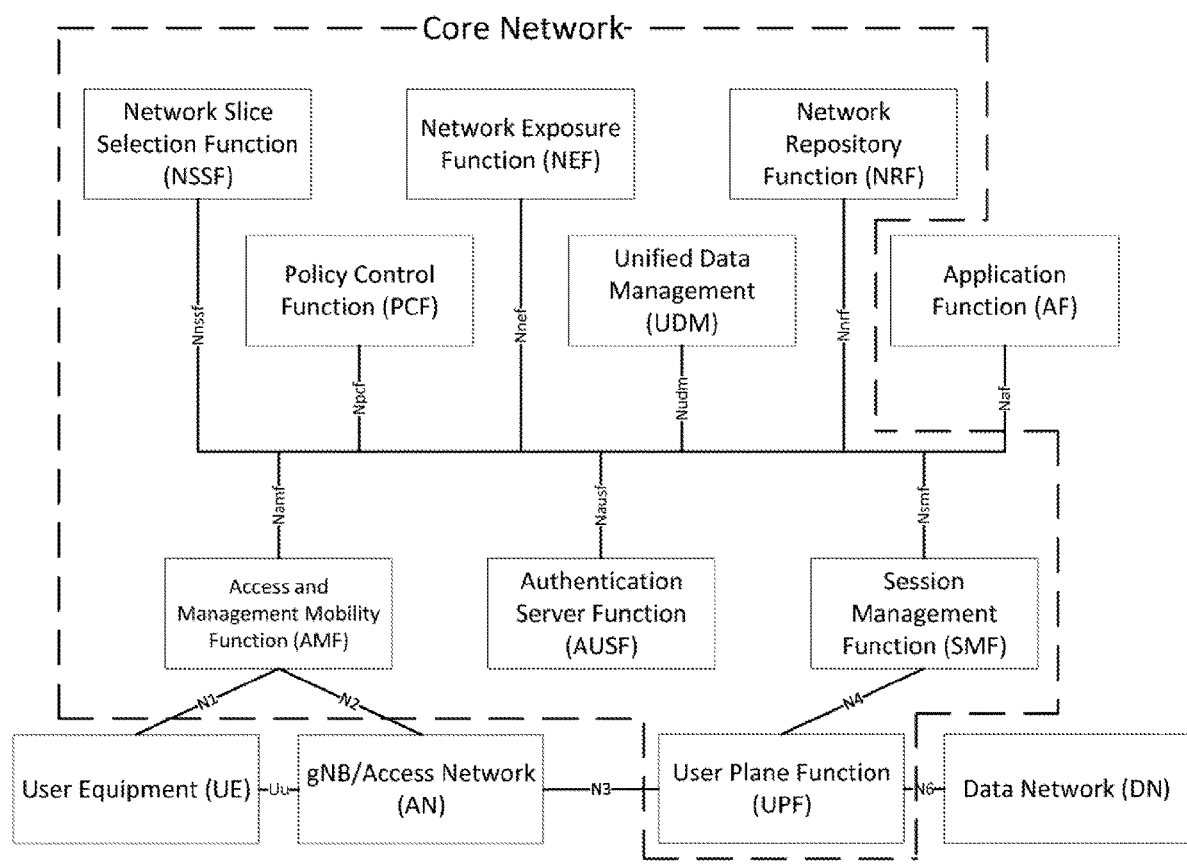
FIG. 1a illustrates an example of a 5G network and system architecture.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for selective indications towards a UE at de-registration with request to re-register, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

3GPP has discussed the need to support fully isolated network slices, but there may be different understandings related to the definition and the requirements to support this scenario. For example, one common understanding is that support for shared RAN with an isolated access and mobility management function (AMF) is a scenario that should be supported. A problem related to supporting this scenario is that if the UE may provide a valid 5G-S-temporary mobile subscriber identity (TMSI) or globally unique AMF identity (GUAMI) in a radio resource control (RRC) message and that does not match with the correct network slice, i.e., correct AMF, then AMF redirection from the initial AMF (the AMF that receives the initial UE connection request over the RAN) to the correct AMF needs to be performed. This scenario may arise, for example, when the UE has been notified by the network (e.g., by the initial AMF) that its list of allowed slices, configured slices or subscribed slices has changed.

As will be discussed in detail below, example embodiments may provide a mechanism based on de-registering the UE and requesting to re-register including a RRC level information. Furthermore, to allow a UE to only request a slice set that is compatible and therefore maximizing the likelihood that the UE NAS signalling is routed by the RAN to the right AMF upfront, certain embodiments may provide a mechanism for the definition of compatible sets of network slices.

Currently, for AMF redirection from the initial AMF to the correct AMF, non-access stratum (NAS) security context transfer over N14 or via RAN is relied upon or has been envisaged at 3GPP. However, NAS security context transfer over RAN may not be a preferable approach because this exposes NAS security keys to RAN. Thus, the remaining current option is to transfer the UE context from the initial AMF to the correct AMF via N14 interface between both AMF(s). However, it is possible that security context transfer via N14 breaks full isolation as an AMF within one slice would need to interface another AMF within the other (possibly with very tight security requirements) slice. This concern can be addressed if the UE registers newly directly with the new AMF, i.e., without the new AMF having to fetch any context/user identifier, etc. from the (initial) AMF that was previously serving the UE. To ensure that the UE registers with the new AMF and the new AMF is able to authenticate the UE, appropriate signalling and indicators would be supported over RRC and NAS signalling.

Current NAS specification already ensures that the UE includes neither the 5G-S-TMSI nor the registered GUAMI to the access stratum (AS) layers (RRC signalling to NG RAN) when trying to register again, this time onto the correct slice. This implies that the UE AS layer will not include these over the RRC message towards the RAN either. So, the RAN will use network slice selection assistance information (NSSAI) for selection of (correct) AMF.

3GPP technical specification (TS) 24.501 indicates that, if the registration procedure for mobility and periodic update was triggered due to the last Configuration Update Command message containing the Configuration update indication information element (IE) with the Registration bit set to "registration requested" and including: no other parameters, one or both of the allowed NSSAI IE and the configured NSSAI IE, or the network slicing indication IE with the network slicing subscription change indication set to "Network slicing subscription changed"; the UE NAS shall not provide the lower layers with the 5G-S-TMSI or the registered GUAMI.

Since the 5G-globally unique temporary identity (GUTI) in the UE is still valid, it will still provide GUTI in the NAS layer. 3GPP TS 24.501 also indicates that a UE supporting N1 mode includes a subscription concealed identifier (SUCI): (1) in the Registration Request message when the UE is attempting initial registration procedure and a valid 5G-GUTI is not available; (2) in the Identity Response message, if the SUCI is requested by the network during the identification procedure; and (3) in the Deregistration Request message when the UE initiates a de-registration procedure and a valid 5G-GUTI is not available.

However, since use of N14 cannot be assumed or allowed for a fully isolated slice, the new AMF cannot use the GUTI (i.e., it cannot validate GUTI with the previous/old AMF over N14 to get the corresponding user Identifier, subscription permanent identifier (SUPI)); rather, the new/correct AMF needs to run full authentication procedure itself from scratch and for this, it needs the SUCI. The new AMF can request the UE to provide this by sending an Identity request to the UE, but this will waste an additional round trip over the air interface thereby wasting precious radio resources. Example embodiments described herein provide solution(s) to avoid at least this issue.

In addition, the UE may not know what exact NSSAI to use unless the AMF indicates that, and also the UE may not be allowed to include NSSAI in RRC if the AS NSSAI inclusion mode is not allowing it to do so. This would prevent the UE from being routed to the correct AMF.

It should be noted that, while some embodiments may be described with reference to NG RAN, example embodiments are not just limited to this scenario as the problem(s) and solution(s) described herein are not exclusively related to NG RAN and may apply, for example, to 5G AN access to a mobile core like the 5GC, as well as other scenarios.

According to certain embodiments, the network may be configured to indicate to the UE when it should perform new registration with SUCI, even when valid 5G-GUTI is available and the Public Land Mobile Network (PLMN) and tracking area are still allowed for the UE. Then, in an embodiment, the UE may include SUCI, e.g., to facilitate a new AMF to directly run full authentication procedure. This approach can address the problem discussed above for the fully isolated network slice scenario, but also address other scenarios whenever the network wants to selectively force full re-authentication in the new AMF.

In one example embodiment, if the UE receives NAS deregistration or UE configuration update (UCU) message with a "registration requested" indication, the UE may include SUCI as mobile identity (even if it has valid 5G-GUTI available) in the subsequent NAS registration request message along with the requested single-NSSAI(s) (S-NSSAI(s)).

In another example embodiment, when the AMF initiates a deregistration request or a UE configuration update (UCU) message or a registration reject, the AMF may include a "SUCI requested" indicator. In this case, the UE shall include SUCI as mobile identity (even if it has valid 5G-GUTI available) in the subsequent NAS registration request message along with the requested S-NSSAI(s).

According to certain embodiments, the source AMF may have determined an allowed NSSAI and a set of rejected S-NSSAIs when deciding the reallocation of the AMF. This information may be conveyed to the UE in the message sent to the UE to trigger the reallocation of AMF with an indication of immediate registration requested, so the UE may include, in the RRC layer and in the NAS layer, a requested NSSAI with this information.

In an embodiment, if the current setting of the UE is to not include the NSSAI in RRC layer (i.e., the "Access Stratum connection establishment NSSAI inclusion mode" is set to not include NSSAI in RRC connection establishment), the AMF may request the UE to override this setting just for this requested registration.

Usually, when a UE re-registers in a PLMN while it has a valid 5G GUTI for this PLMN, it may be more optimum for the UE to provide this 5G-GUTI over NAS in the new registration. However, in cases where the AMF that commands the UE to re-register detects via local configuration that the UE will now be served by a set of slices with which it is isolated, this AMF may set the indication described above to specify to the UE to disregard the (valid) 5G-GUTI and to provide its SUCI in the new registration attempt.

As a result, the new (target) AMF is able to receive the SUCI and run the full authentication procedure directly without relying on the old/previous AMF and/or without separately requesting the UE to send SUCI with an identity request procedure initiated by this new AMF. This enables support for the fully isolated network slice and also allows optimized NAS procedure, avoiding unnecessary identity request procedures just to retrieve SUCI (when it is already known that GUTI will not be used by the target AMF as N14 cannot be used to retrieve the SUPI corresponding to this 5G-GUTI, by the target AMF).

FIG. 1a illustrates an example of a 5G network and system architecture in which certain embodiments may be implemented. FIG. 1a illustrates multiple network functions that may be implemented as software operating as part of a network device or dedicated hardware, as a network device itself or dedicated hardware, or as a virtual function operating as a network device or dedicated hardware. These network functions include an AMF, user plane function (UPF), authentication server function (AUSF), session management function (SMF), network slice selection function (NSSF), network exposure function (NEF), network repository function (NRF), policy control function (PCF), unified data management (UDM), and application function (AF). In this example, the 5G RAN may contain the gNB and UE, which may be connected via NG interfaces to the 5G core network. For example, the UE may be connected to the AMF via N1 interface and the gNB may be connected to the AMF via N2 interface. The AMF may provide service that may include, for instance, registration management, connection management, reachability management, mobility management and various functions relating to security and access management and authorization. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

Figure 1B:
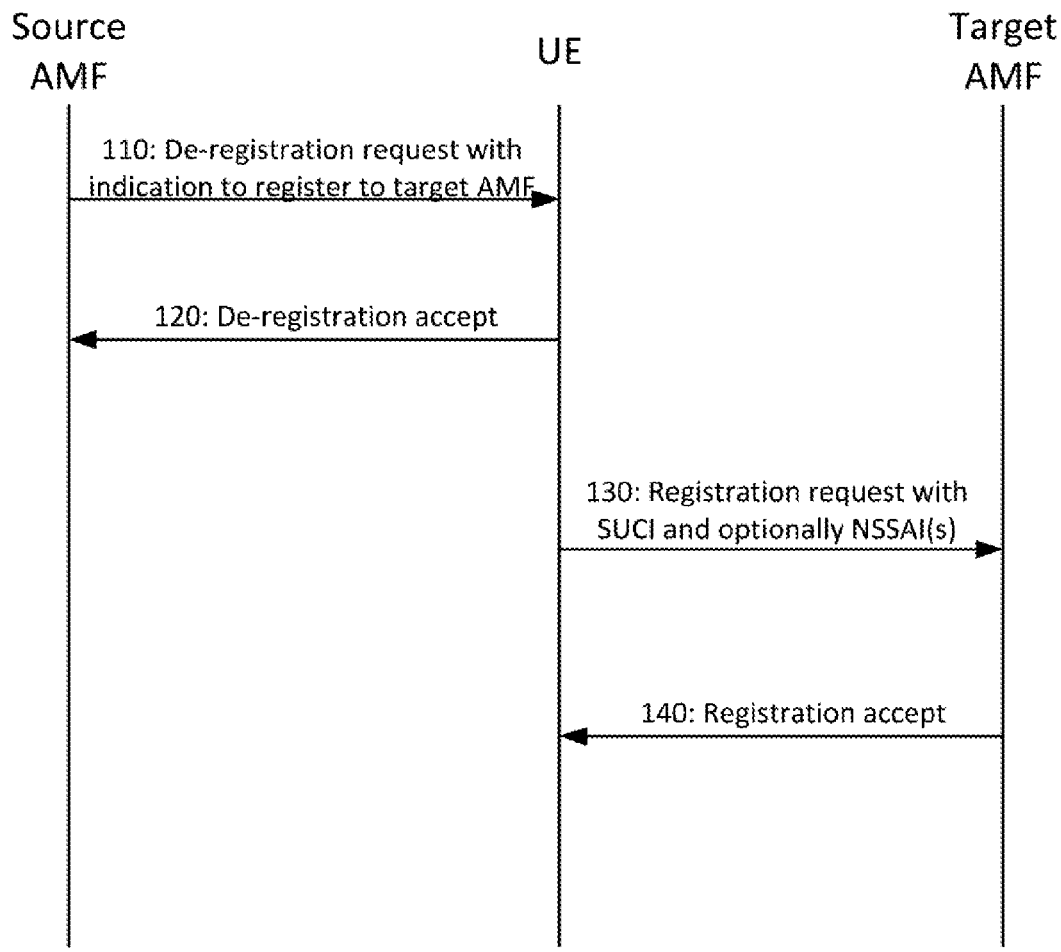
FIG. 1b illustrates an example signaling diagram, according to an embodiment.

FIG. 1b illustrates an example signaling diagram, according to certain embodiments. As illustrated in the example of FIG. 1b, at 110, a source AMF may transmit a message to a UE to trigger de-registration from the source AMF and request re-registration to a target AMF. In one embodiment, the message 110 may include an indication to the UE to include SUCI in the registration request to the target AMF. The indication may be, for example, a registration requested indication and/or SUCI requested indication. According to some embodiments, the message 110 may be a de-registration request (e.g., NAS de-registration request), UCU, and/or registration reject message. In one example, at 120, the UE may transmit a de-registration accept message to the source AMF.

In an embodiment, the source AMF may determine an allowed NSSAI and a set of rejected S-NSSAIs when deciding upon the reallocation of the AMF. According to certain embodiments, this NSSAI information may be conveyed to the UE in the message 110 with an indication of immediate registration requested, so that the UE may include, in the RRC layer and/or in the NAS layer, a requested NSSAI with this information. In an embodiment, if the current setting of the UE is to not include the NSSAI in RRC layer, the source AMF may request, e.g., in the message 110, that the UE overrides this setting just for this requested registration.

As further depicted in the example of FIG. 1b, at 130, the UE may transmit a registration request to the target AMF. The registration request to the AMF may include SUCI and, optionally, the requested S-NSSAI(s). For example, if the UE receives, at 110, a NAS deregistration or UCU message with a registration requested indication, the UE may include SUCI as mobile identity (even if it has valid 5G-GUTI available) in the subsequent NAS registration request message 130 to the target AMF, along with the requested S-NSSAI(s). As another example, when the source AMF initiates a deregistration request or registration reject, the source AMF may include a SUCI requested indicator in the message 110 and, in this case, the UE should include SUCI as mobile identity (even if it has valid 5G-GUTI available) in the subsequent NAS registration request message 130 to the target AMF, along with the requested S-NSSAI(s). In one embodiment, the target AMF may transmit, at 140, a registration accept message to the UE.

Figure 2A:
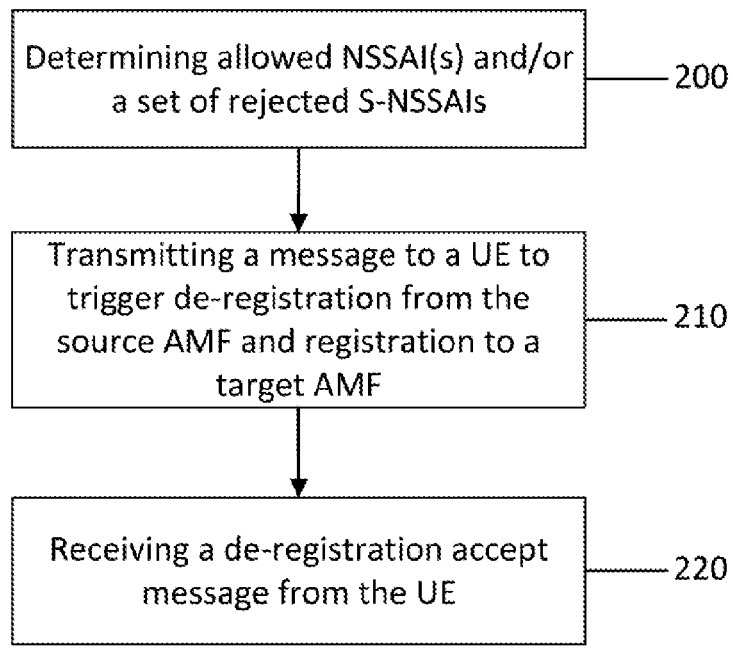
FIG. 2a illustrates an example flow diagram of a method, according to an embodiment.

FIG. 2a illustrates an example flow diagram of a method for indicating to a UE when to request to re-register with an AMF in communication systems, such as 5GS, according to one example embodiment. In an example embodiment, the method of FIG. 2a may be performed by an AMF, such as the source AMF illustrated in FIG. 1. In other example embodiments, the flow diagram of FIG. 2a may be performed by a network entity or network node associated with a communication system, such as LTE or 5G NR. For instance, in some example embodiments, the network node performing the method of FIG. 2a may include a base station, eNB, gNB, and/or NG-RAN node.

As illustrated in the example of FIG. 2a, the method may optionally include, at 200, determining allowed NSSAI(s) and/or a set of rejected S-NSSAIs when deciding upon the reallocation of an AMF for a UE. According to certain embodiments, the method may also include, at 210, transmitting a message to a UE to trigger de-registration from the source AMF and registration to a target AMF. In one example, the message may include an indication to the UE to include SUCI in the registration request to the target AMF. In an embodiment, the message may include an indication of the allowed NSSAI(s) and/or set of rejected S-NSSAI(s). According to some embodiments, the message may be a de-registration request (e.g., NAS de-registration request), UCU, and/or registration request message. In certain embodiments, the indication to the UE may be a registration request indication and/or SUCI requested indication. According to some example embodiments, the indication to the UE may also include a request to the UE to override its setting to not include the NSSAI in RRC layer for the requested registration with the target AMF. In an embodiment, the method may also include, at 220, receiving a de-registration accept message from the UE.

Figure 2B:
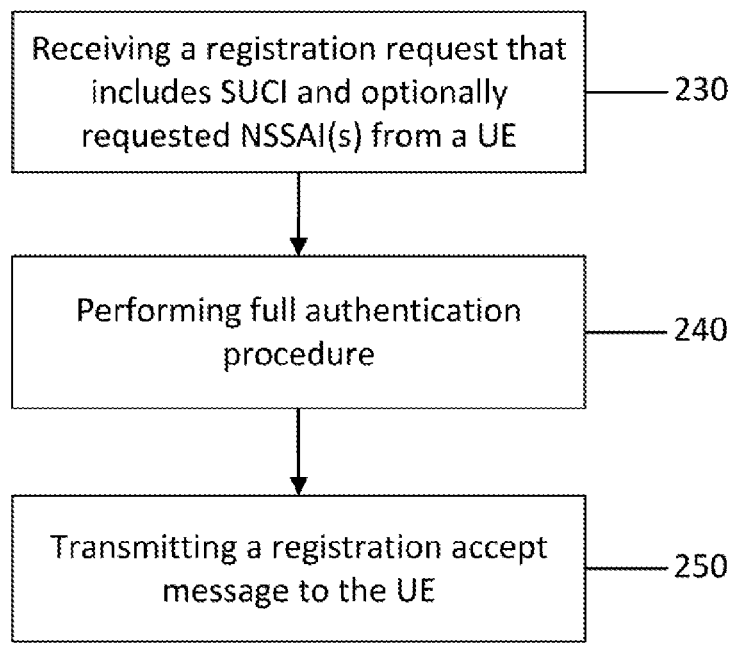
FIG. 2b illustrates an example flow diagram of a method, according to an embodiment.

FIG. 2b illustrates an example flow diagram of a method for re-registering a UE with an AMF in communication systems, such as 5GS, according to one example embodiment. In an example embodiment, the method of FIG. 2b may be performed by an AMF, such as the target AMF illustrated in FIG. 1. In other example embodiments, the flow diagram of FIG. 2b may be performed by a network entity or network node associated with a communication system, such as LTE or 5G NR. For instance, in some example embodiments, the network node performing the method of FIG. 2a may include a base station, eNB, gNB, and/or NG-RAN node.

As illustrated in the example of FIG. 2b, the method may include, at 230, receiving a registration request that includes SUCI and optionally requested NSSAI(s) from a UE. In an embodiment, the method may then include, at 240, performing full authentication procedure directly without relying on the previous (source) AMF and/or without separately requesting the UE to send SUCI using an identity request procedure initiated by the current (target) AMF. According to certain embodiments, the method may also include, at 250, transmitting a registration accept message to the UE.

Figure 2C:
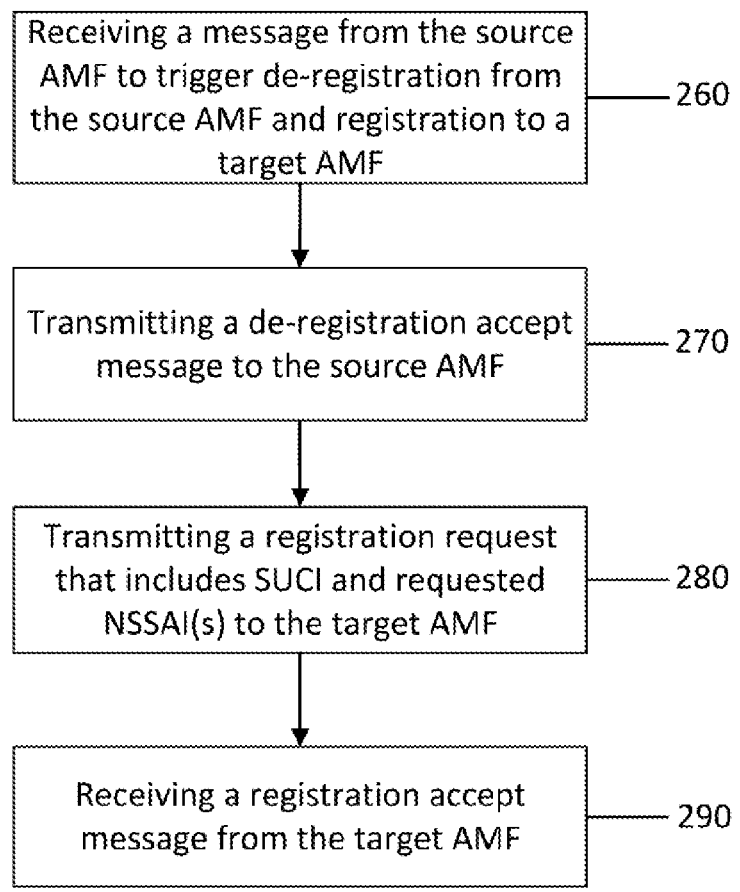
FIG. 2c illustrates an example flow diagram of a method, according to an embodiment.

FIG. 2c illustrates an example flow diagram of a method for de-registering from an (source) AMF and re-registering with a new (target) AMF, according to one example embodiment. In certain example embodiments, the flow diagram of FIG. 2c may be performed by a network entity or network node associated with a communications system, such as LTE or 5G NR. For instance, in some example embodiments, the network entity performing the method of FIG. 2c may be a UE, mobile station, IoT device, or the like. In one example embodiment, the method of FIG. 2c may be performed by the UE illustrated in FIG. 1, for instance.

As illustrated in the example of FIG. 2c, the method may include, at 260, receiving a message from the source AMF to trigger de-registration from the source AMF and registration to a target AMF. In one example, the message may include an indication to include SUCI in the registration request to the target AMF. In an embodiment, the message may include an indication of the allowed NSSAI(s) and/or set of rejected S-NSSAI(s). According to some embodiments, the message may be a de-registration request (e.g., NAS de-registration request), UCU, and/or registration request message. In certain embodiments, the indication from the source AMF may be a registration request indication and/or SUCI requested indication. According to some example embodiments, the indication from the source AMF may also include a request to the UE to override its setting to not include the NSSAI in RRC layer for the requested registration with the target AMF. In an embodiment, the method may also include, at 270, transmitting a de-registration accept message to the source AMF.

In an embodiment, the method of FIG. 2c may include, at 280, transmitting a registration request that includes SUCI and requested NSSAI to the target AMF. According to certain embodiments, the method may also include, at 290, receiving a registration accept message from the target AMF.

Figure 3A:
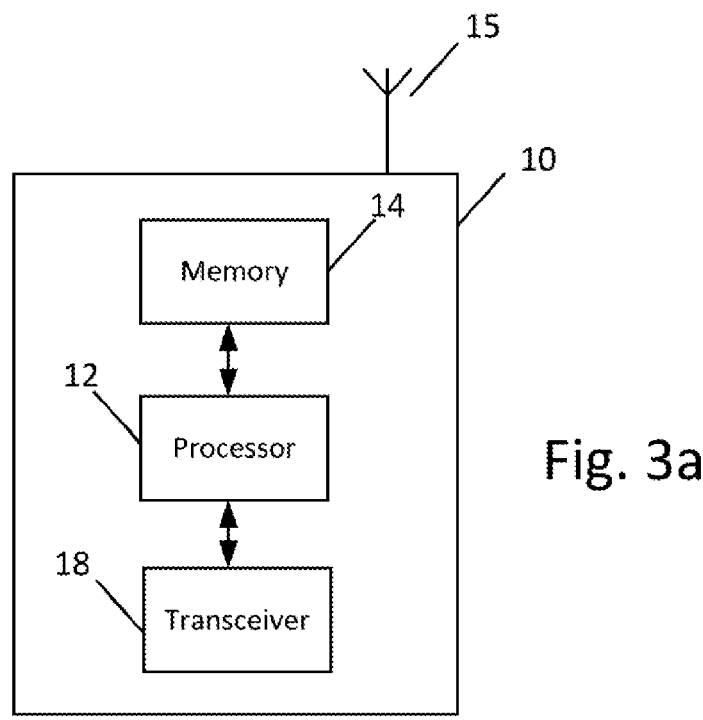
FIG. 3a illustrates an example block diagram of an apparatus, according to an embodiment.

FIG. 3a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be or may include a NG-RAN node, an eNB in LTE, gNB in 5G, or AMF. For instance, in one embodiment, apparatus 10 may correspond to the source AMF and/or target AMF illustrated in FIG. 1

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 3a.

As illustrated in the example of FIG. 3a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 3a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, AMF, or the like. For example, in some embodiments, apparatus 10 may be configured to perform one or more of the processes depicted in any of the flow charts or signaling diagrams described herein, such as those illustrated in FIG. 1, FIG. 2*a*, FIG. 2*b*, and/or FIG. 2*c*. In some embodiments, as discussed herein, apparatus 10 may be configured to perform a procedure relating to selective indication(s) to a UE to de-register and re-register with another AMF.

In one embodiment, apparatus 10 may be a current or source AMF. According to this embodiment, apparatus 10 may be controlled by memory 14 and processor 12 to determine allowed NSSAI and a set of rejected S-NSSAIs when deciding upon the reallocation of an AMF for a UE. According to certain embodiments, apparatus 10 may be controlled by memory 14 and processor 12 to transmit a message to a UE to trigger de-registration from the source AMF and registration to a target AMF. In one example, the message may include an indication to the UE to include SUCI in the registration request to the target AMF. In an embodiment, the message may include an indication of the allowed NSSAI(s) and/or set of rejected S-NSSAI(s).

According to some embodiments, the message may be a de-registration request (e.g., NAS de-registration request), UCU, and/or registration request message. In certain embodiments, the indication to the UE may be a registration request indication and/or SUCI requested indication. According to some example embodiments, the indication to the UE may also include a request to the UE to override its setting to not include the NSSAI in RRC layer for the requested registration with the target AMF. In an embodiment, apparatus 10 may be controlled by memory 14 and processor 12 to receive a de-registration accept message from the UE.

In a further embodiment, apparatus 10 may be a new or target AMF. According to an embodiment, apparatus 10 may be controlled by memory 14 and processor 12 to receive a registration request that includes SUCI and optionally requested NSSAI(s) from a UE. In an embodiment, apparatus 10 may be controlled by memory 14 and processor 12 to perform a full authentication procedure directly without relying on the previous (source) AMF and/or without separately requesting the UE to send SUCI using an identity request procedure initiated by the current (target) AMF. According to certain embodiments, apparatus 10 may be controlled by memory 14 and processor 12 to transmit a registration accept message to the UE.

Figure 3B:
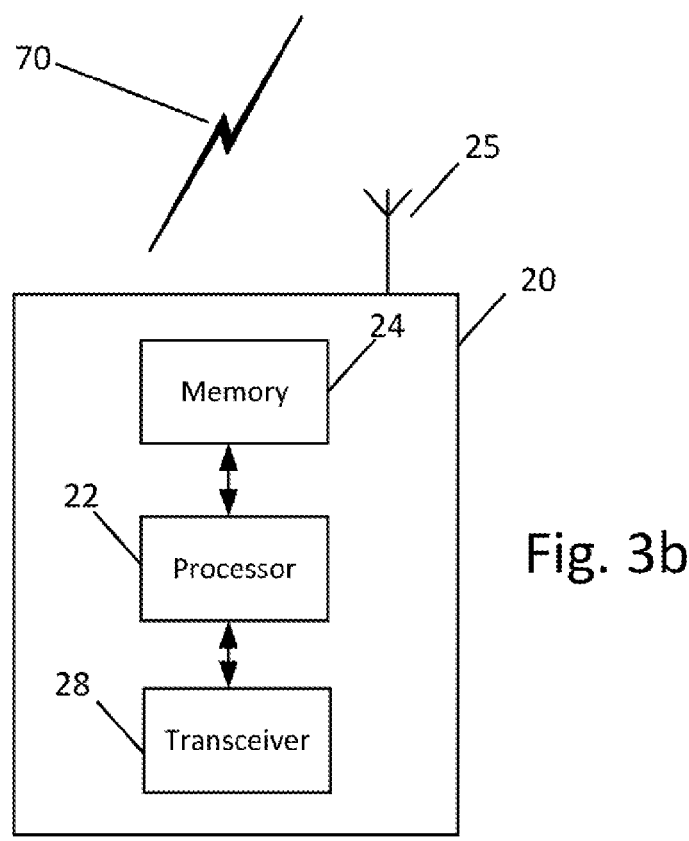
FIG. 3b illustrates an example block diagram of an apparatus, according to an embodiment.

FIG. 3*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 3*b*.

As illustrated in the example of FIG. 3*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 3*b*, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multiprocessor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, FIG. 2a, FIG. 2b, and/or FIG. 2c. In certain embodiments, apparatus 20 may include or represent a UE and may be configured to perform a procedure relating to de-registering with an AMF and re-registering with another AMF, for instance.

In certain embodiments, apparatus 20 may be controlled by memory 24 and processor 22 to receive a message from the source AMF to trigger de-registration from the source AMF and registration to a target AMF. In one example, the message may include an indication to include SUCI in the registration request to the target AMF. In an embodiment, the message may include an indication of the allowed NSSAI(s) and/or set of rejected S-NSSAI(s). According to some embodiments, the message may be a de-registration request (e.g., NAS de-registration request), UCU, and/or registration reject message. In certain embodiments, the indication from the source AMF may be a registration request indication and/or SUCI requested indication. According to some example embodiments, the indication from the source AMF may also include a request to the UE to override its setting to not include the NSSAI in RRC layer for the requested registration with the target AMF. In an embodiment, apparatus 20 may be controlled by memory 24 and processor 22 to transmit a de-registration accept message to the source AMF.

In an embodiment, apparatus 20 may be controlled by memory 24 and processor 22 to transmit a registration request that includes SUCI and requested NSSAI to the target AMF. According to certain embodiments, apparatus 20 may be controlled by memory 24 and processor 22 to receive a registration accept message from the target AMF.

Therefore, certain example embodiments provide several technological improvements, enhancements, and/or advantages over existing technological processes and constitute an improvement at least to the technological field of wireless network control and management. For example, certain embodiments provide a mechanism based on de-registering a UE and requesting it to re-register including RRC level information. Furthermore, to allow the UE to request a slice set that is compatible and therefore maximizing the likelihood that the UE NAS signaling is routed by the RAN to the appropriate AMF upfront, a mechanism for the definition of compatible sets of network slices may be defined. Additionally, to avoid the need to request the UE identity as the registration is performed, an indication may be provided to the UE to include the SUCI and not the 5G-GUTI, e.g., in a registration request message. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment is directed to a method that may include transmitting, from an access and mobility management function (AMF) a message to at least one user equipment to trigger de-registration from the access and mobility management function (AMF) and registration to another access and mobility management function (AMF). The message may include an indication to the at least one user equipment to include subscription concealed identifier (SUCI) in the registration request to the another access and mobility management function (AMF).

In a variant, the message may include at least one of an indication of allowed network slice selection assistance information (NSSAI) and/or set of rejected single-network slice selection assistance information (S-NSSAI(s)).

According to a variant, the message may include at least one of a de-registration request, user equipment configuration update (UCU), and/or registration reject message.

In a variant, the indication to the at least one user equipment may include at least one of a registration request indication and/or subscription concealed identifier (SUCI) requested indication.

According to a variant, the indication to the at least one user equipment may include a request to the at least one user equipment to override its AS connection establishment NSSAI inclusion mode setting to not include the NSSAI in the AS connection establishment procedure necessary to transmit the non access stratum registration request with the another access and mobility management function (AMF).

In a variant, the method may further include determining allowed network slice selection assistance information (NSSAI) and a set of rejected single-network slice selection assistance information (S-NSSAI(s)) when deciding upon the reallocation to another access and mobility management function (AMF) for the at least one user equipment.

According to a variant, the user equipment may include in the registration request and in the AS connection establishment NSSAI which is the same as the allowed NSSAI received in the indication of allowed NSSAI.

In another variant, the method may also include receiving a de-registration accept message from the at least one user equipment.

A second embodiment may be directed to a method that may include receiving, at an access and mobility management function (AMF), a registration request from a user equipment. The registration request may include a subscription concealed identifier (SUCI) and optionally may include requested network slice selection assistance information (NSSAI(s)).

In a variant, the method may further include performing a full authentication procedure directly without relying on a previous access and mobility management function (AMF) and/or without separately initiating an identity request procedure to request the user equipment to send the subscription concealed identifier (SUCI).

According to a variant, the method may further include transmitting a registration accept message to the user equipment.

A third embodiment may be directed to a method that may include receiving, at a user equipment, a message from an access and mobility management function (AMF) to trigger de-registration from the access and mobility management function (AMF) and registration to another access and mobility management function (AMF). The message may include an indication to the user equipment include a subscription concealed identifier (SUCI) in the registration request to the another access and mobility management function (AMF).

In a variant, the message may include at least one of an indication of allowed network slice selection assistance information (NSSAI) and/or set of rejected single-network slice selection assistance information (NSSAI(s)).

According to a variant, the message may include at least one of a de-registration request, user equipment configuration update (UCU), and/or registration reject message.

In a variant, the indication to the user equipment may include at least one of a registration request indication and/or subscription concealed identifier (SUCI) requested indication.

According to a variant, the indication to the user equipment may include a request to the user equipment to override its AS connection establishment NSSAI inclusion mode setting to not include the NSSAI in the AS connection establishment procedure necessary to transmit the NAS registration request with the another access and mobility management function (AMF).

In a variant, the method may further include transmitting a de-registration accept message to the access and mobility management function (AMF).

In another variant, the user equipment may include in the registration request and in the AS connection establishment NSSAI which is the same as the allowed NSSAI received in the indication of allowed NSSAI.

In a further variant, the user equipment may include the SUCI in the registration request with another AMF even though it had a valid temporary user identifier (GUTI) allocated by the corresponding network.

A fourth embodiment is directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, and/or any other embodiments discussed herein, or any of the variants described above.

A fifth embodiment is directed to an apparatus that may include circuitry configured to perform the method according to the first embodiment, the second embodiment, the third embodiment, and/or any other embodiments discussed herein, or any of the variants described above.

A sixth embodiment is directed to an apparatus that may include means for performing the method according to the first embodiment, the second embodiment, the third embodiment, and/or any other embodiments discussed herein, or any of the variants described above.

A seventh embodiment is directed to a non-transitory computer readable medium comprising program instructions stored thereon for performing at least the method according to the first embodiment, the second embodiment, the third embodiment, and/or any other embodiments discussed herein, or any of the variants described above.

The invention claimed is:

1. A method, comprising:
receiving, at a user equipment, a message from an access and mobility management function to trigger de-registration of the user equipment from the access and mobility management function and registration of the user equipment to another access and mobility management function (AMF),
wherein the message comprises an indication to the user equipment to include subscription concealed identifier in a registration request when the user equipment registers to the another access and mobility management function,
wherein the message comprises an allowed network slice selection assistance information (NSSAI) and a set of rejected single-network slice selection assistance information, or a de-registration request, a user equipment configuration update, and a registration reject message,
wherein the indication to the user equipment comprises at least one of a registration request indication or subscription concealed identifier (SUCI) requested indication, and
wherein the message comprises a further indication to the user equipment to override its access stratum connection establishment network slice selection assistance information inclusion mode setting,
wherein the registration request includes an allowed NSSAI,
wherein the registration request includes the subscription concealed identifier, when registering to the another access and mobility management even though the user equipment comprises a valid global temporary user identifier;
transmitting a de-registration accept message to the access and mobility management function;
transmitting, by the user equipment, a registration request to the another access and mobility management function, wherein the registration request includes SUCI and NSSAI; and
receiving, by the UE, a message indicating acceptance of registration.

* * * * *